(12) United States Patent
Xu et al.

(10) Patent No.: US 9,769,450 B2
(45) Date of Patent: Sep. 19, 2017

(54) INTER-VIEW FILTER PARAMETERS RE-USE FOR THREE DIMENSIONAL VIDEO CODING

(75) Inventors: Lidong Xu, Beijing (CN); Yi-Jen Chiu, San Jose, CA (US); Zhipin Deng, Beijing (CN); Wenhao Zhang, Beijing (CN); Yu Han, Beijing (CN); Xiaoxia Cai, Beijing (CN); Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 13/977,583

(22) PCT Filed: Jul. 4, 2012

(86) PCT No.: PCT/CN2012/078184
§ 371 (c)(1),
(2), (4) Date: Sep. 29, 2013

(87) PCT Pub. No.: WO2014/005305
PCT Pub. Date: Jan. 9, 2014

(65) Prior Publication Data
US 2015/0312545 A1   Oct. 29, 2015

(51) Int. Cl.
*H04N 13/00* (2006.01)
*H04N 19/597* (2014.01)
*H04N 19/463* (2014.01)
*H04N 19/82* (2014.01)

(52) U.S. Cl.
CPC ..... *H04N 13/0007* (2013.01); *H04N 13/0037* (2013.01); *H04N 13/0048* (2013.01); *H04N 19/463* (2014.11); *H04N 19/597* (2014.11); *H04N 19/82* (2014.11)

(58) Field of Classification Search
CPC .......... H04N 13/0007; H04N 13/0037; H04N 13/0048
USPC ..................................................... 375/240.01
See application file for complete search history.

(56) References Cited

U.S. PATENT DOCUMENTS

| | | | |
|---|---|---|---|
| 2009/0010331 A1 | 1/2009 | Jeon et al. | |
| 2013/0182755 A1* | 7/2013 | Chen et al. | 375/240.01 |
| 2013/0182779 A1* | 7/2013 | Lim | H04N 19/597 |
| | | | 375/240.29 |
| 2013/0229485 A1* | 9/2013 | Rusanovskyy et al. | 348/43 |

(Continued)

FOREIGN PATENT DOCUMENTS

| | | |
|---|---|---|
| CN | 101491101 A | 7/2009 |
| CN | 101965732 A | 2/2011 |
| CN | 102598660 A | 7/2012 |

(Continued)

OTHER PUBLICATIONS

International Preliminary Report on Patentability and Written Opinion received for PCT Patent Application No. PCT/CN2012/078184, mailed on Jan. 15, 2015, 9 pages.

(Continued)

*Primary Examiner* — Zhihan Zhou
(74) *Attorney, Agent, or Firm* — Schiff Hardin LLP (57) ABSTRACT

Described herein are techniques related to re-use of filter parameters, and particularly Sample Adaptive Offset (SAO) parameters, of an independent view or coded dependent views for coding dependent views for three dimension (3D) video encoding.

24 Claims, 9 Drawing Sheets

(56) References Cited

U.S. PATENT DOCUMENTS

| | | | |
|---|---|---|---|
| 2014/0146891 A1* | 5/2014 | Chuang et al. | 375/240.16 |
| 2014/0328389 A1* | 11/2014 | Fu et al. | 375/240.02 |

FOREIGN PATENT DOCUMENTS

| | | | | |
|---|---|---|---|---|
| CN | 102742269 A | 10/2012 | | |
| KR | 10-2008-0093425 A | 10/2008 | | |
| KR | 2008-0093425 A | 10/2008 | | |
| KR | 10-2012-0033289 A | 4/2012 | | |
| KR | WO 2012044093 A2 * | 4/2012 | ............ | H04N 19/30 |
| WO | 2010/123862 A1 | 10/2010 | | |
| WO | 2011/094047 A1 | 8/2011 | | |
| WO | WO 2012167712 A1 * | 12/2012 | | |
| WO | WO 2013091513 A1 * | 6/2013 | | |
| WO | 2014/005305 A1 | 1/2014 | | |

OTHER PUBLICATIONS

International Search report and Written Opinion received for PCT Patent Application No. PCT/CN2012/078184, mailed on Apr. 18, 2013, 14 pages.

Office Action received for Korean Patent Application No. 2014-7034035, mailed on Sep. 24, 2015, 6 pages of English Translation and 6 pages of Korean Office Action.

Extended Search Report received for Patent Application No. 12880411.9, mailed on Feb. 19, 2016, 10 pages.

Notice of Allowance received for Korean Patent Application No. 10-2014-7034035, mailed on Mar. 29, 2016, 4 pages (1 page of English Translation and 3 pages of Official copy).

Fu et al., "CE13: Sample Adaptive Offset with LCU-Independent Decoding", Joint Collaborative Team on Video (JCT-VC) of ITU-T SG16 WP3 and ISO/IEC JTC1/SC29/WG11, MediaTek Inc., Mar. 16-23, 2011, 6 pages.

Sullivan et al., "Overview of the High Efficiency Video Coding (HEVC) Standard" IEEE Transactions on Circuits and Systems for Video Technology, 2012, 19 pages.

Husak et al., "Evaluation of New Tools and Anchors for Frame Compatible Full resolution 3D Video Delivery", International Organisation for Standardisation Organisation Internationale De Normalisation ISO/IEC JTC1/SC29/WG11 Coding of Moving Pictures and Audio, Nov. 24, 2011, 14 Pages.

Rusert Thomas, "30-HEVC HLS: Inter-layer SPS Prediction",International Organisation for Standardisation Organisation Internationale De Normalisation ISO/IEC JTC1/SC29/WG11 Coding of Moving Pictures and Audio, Apr. 25, 2012, 5 pages.

Office Action and Search Report received for Chinese Patent Application No. 201280073703.6, mailed on Feb. 13, 2017, 10 pages of Chinese Office Action only.

* cited by examiner

| Table 1 Total 5 sao types | | |
|---|---|---|
| sao type | saoTypeIDx | description |
| SAO_EO_0 | 0 | 1D 0-degree edge |
| SAO_EO_1 | 1 | 1D 90-degree edge |
| SAO_EO_2 | 2 | 1D 135-degree edge |
| SAO_EO_3 | 3 | 1D 45-degree edge |
| BO | 4 | Band offset |

| Table 2 Total 5 kinds of edge types | | |
|---|---|---|
| edge type | edgeIDx | description |
| ∨ | 1 | c < 2 neighboring pixels |
| ╲ or ╱ | 2 | c < 1 neighbor && c ==1 neighbor |
| ╱ or ╲ | 3 | c > 1 neighbor && c ==1 neighbor |
| ∧ | 4 | c > 2 neighbors |
| — | 0 | None of the above |

INTER-VIEW FILTER PARAMETERS RE-USE FOR THREE DIMENSIONAL VIDEO CODING

BACKGROUND

Video coding is a process of preparing video (video data), where the video is encoded to meet proper formats and specifications for recording and playback. Video has evolved from two dimension (2D) to three dimension (3D). However, devices still make use of 2D encoders and decoders. For example, in order to be backward compatible with conventional 2D video encoders and decoders, one of the 3D views, which may be referred to as an independent view or base view, may be coded independently without reference to other views. Other views which may be referred to as dependent views or auxiliary views may be coded by utilizing correlations in the same view, but also correlations among neighboring views and associated depth maps.

In the example of a stereo case, multi-view video contains a large amount of inter-view statistical dependencies, since cameras may capture the same scene simultaneously from different points of view. These can be exploited for combined temporal prediction and inter-view prediction which are not only predicted from temporally neighboring pictures but also from corresponding pictures in adjacent coded views. Therefore, for a dependent view, the texture and depth can be predicted from the pictures of other coded views or previously coded pictures in the same view.

3D Video Coding (3DVC) refers to one of various video compression standard targeted to apply to 3D displays. 3DVC is governed by the ISO/IEC Moving Picture Experts Group (MPEG). 3DVC may be based on the High Efficient Video Coding (HEVC) standard, in which the HEVC is one of the latest conventional video coding standards. 3DVC may also be based on the traditional H.264/AVC. In 3DVC, Multi-view Video plus Depth (MVD) concept is used to represent 3D video content, in which a limited number of views and associated depth maps are coded and multiplexed into a bit stream. Camera parameters of each view are also packed into the bit stream for the purpose of view synthesis. For three dimensional or 3D video coding and compression, multiple views, associated depth maps, and camera parameters are coded in a bit stream to support various 3D video applications.

Sample Adaptive Offset (SAO) is an in-loop filter technique adopted into the HEVC standard to improve the quality of reconstructed pictures. SAO filter parameters, including filter control flags, SAO types, offset values, etc., are determined by an encoder and then transmitted to a decoder. HEVC-3DVC is a next generation 3D video coding standard, in which the independent view is coded by HEVC encoder.

In video coding and compression, a continuing challenge exists to provide methods and processes that minimize the use of resources, such as computational resources. In particular, there is a continuing need to provide resource efficient coding and compression schemes for encoding and decoding. This becomes a greater goal as video coding and compression evolves to support 3D video.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for implementing a Sample Adaptive Offset (SAO) filter for three dimensional or 3D Video Coding or 3DVC such as implemented by the High Efficient Video Coding (HEVC) standard, for dependent view coding, and directly re-use SAO filter parameters of an independent view or a coded dependent view to encode another dependent view, or re-use only part of the SAO filter parameters of the independent view or a coded dependent view to encode another dependent view.

Figure 1:
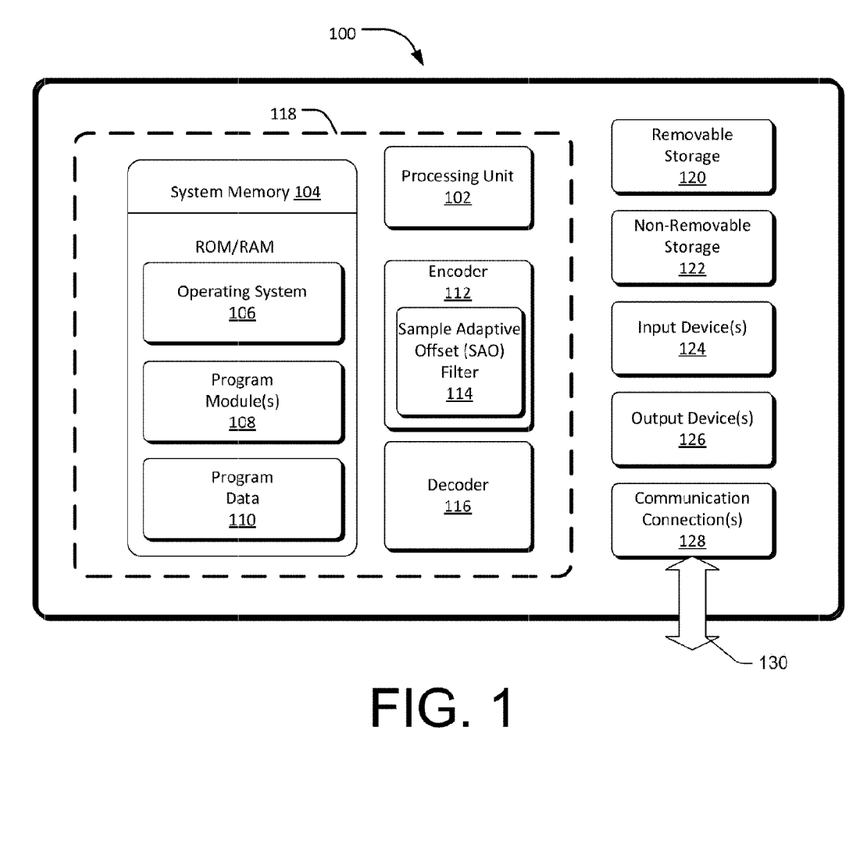
FIG. 1 is an illustrative diagram of an example system for implementing a Sample Adaptive Offset (SAO) re-use for three dimension video.

FIG. 1 shows an example system/computing device 100 that may be utilized to implement various described embodiments. However, it will be readily appreciated that the techniques disclosed herein may be implemented in other computing devices, systems, and environments. The computing device 100 shown in FIG. 1 is one example of a computing device and is not intended to suggest any limitation as to the scope of use or functionality of the computer and network architectures.

In at least one implementation, computing device 100 includes at least one processing unit 102 and system memory 104. Depending on the exact configuration and type of computing device, system memory 104 may be volatile (such as RAM), non-volatile (such as ROM, flash memory, etc.) or some combination thereof. System memory 104 may include an operating system 106, one or more program modules 108, that in certain implementations may implement the algorithm methods and techniques describe herein. System memory 104 may further include program data 110 which may include macro blocks/shapes database(s) as described later in this document. Furthermore, an encoder 112 is included in this example. The encoder 112 may be used to implement 3D video coding or 3DVC described herein. The encoder 112 may be operatively coupled to and communicate with processing unit 102, system memory 104, and other memory, input/output, devices, further described herein, and other components/devices not shown.

In this example, encoder 112 includes a Sample Adaptive Offset or SAO filter 114. As further discussed, SAO filter 114 may be used for 3DVC dependent view coding, and to directly re-use SAO filter parameters of an independent view or a coded dependent view to encode another dependent view. In certain cases, SAO filter 114 is used for re-use of only part of the SAO filter parameters of the independent view or a coded dependent view to encode another dependent view. Furthermore, device 100 may include a decoder 116. Example functions of both encoder 112 and decoder 116 are further described below.

A basic implementation of the computing device 100 is demarcated by a dashed line 118. For example, in certain implementations, encoder 112 and/or decoder 116 may be part of an integrated graphics chip set of a central processing units (CPU) that includes 3D and media, having media functionality that includes video, specifically video decode/encode. In certain implementations, an application specific integrated circuit or ASIC may include the encoder 112 and/or decoder 116 as a fixed function encoder/decoder It is contemplated that devices with video encoding may make use of the techniques, methods, and devices described. Examples of such devices include media players, video conferencing devices, etc.

In certain implementations, program modules 108 may include specific modules (not shown) such as a codec or software/firmware based encoder, configured to implement the video encoding techniques and methods described herein. For example, such modules in certain implementations may perform the processes of encoder 112. Example codecs include AVC, VC1, and SVC.

Computing device 100 may have additional features or functionality. For example, computing device 100 may also include additional data storage devices such as removable storage 120 and non-removable storage 122. In certain implementations, the removable storage 120 and non-removable storage 122 are an example of computer accessible media for storing instructions that are executable by the processing unit 102 to perform the various functions described above. Generally, any of the functions described with reference to the figures may be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that may be used to store information for access by a computing device, e.g., computing device 100. Any of such computer accessible media may be part of the computing device 100.

In one implementation, the removable storage 120, which is a computer accessible medium, has a set of instructions stored thereon. When executed by the processing unit 102, the set of instructions cause the processing unit 102 to execute operations, tasks, functions and/or methods as described herein, and any variations thereof.

Computing device 100 may also include one or more input devices 124 such as keyboard, mouse, pen, voice input device, touch input device, etc. Computing device 100 may additionally include one or more output devices 126 such as a display, speakers, printer, etc.

Computing device 100 may also include one or more communication connections 128 that allow the computing device 100 to communicate by wire or wirelessly with one or more other devices (not shown), over connection 130. It is appreciated that the illustrated computing device 100 is one example of a suitable device and is not intended to suggest any limitation as to the scope of use or functionality of the various embodiments described.

Figure 2:
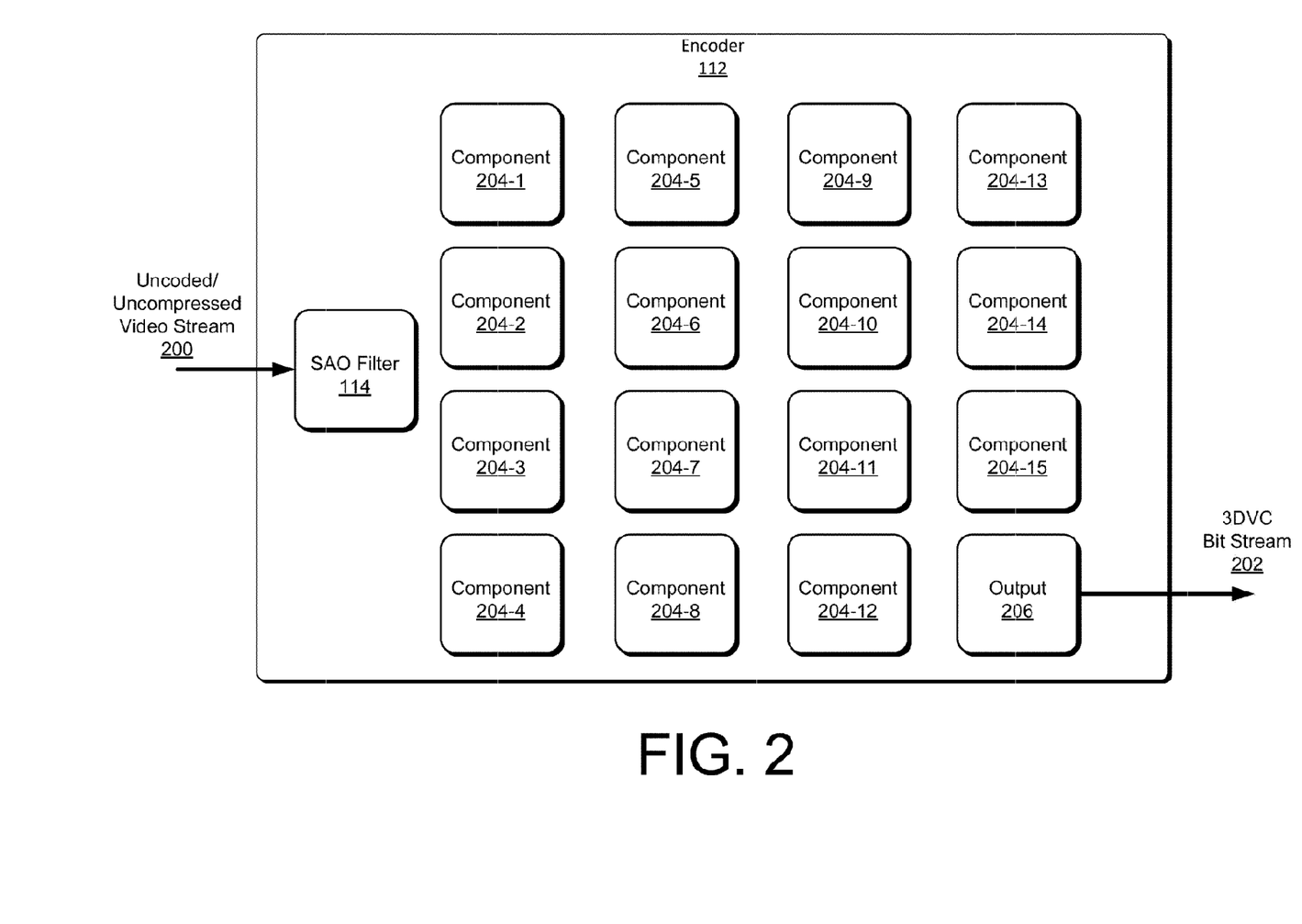
FIG. 2 is an illustrative diagram of an example video encoder for implementing Sample Adaptive Offset (SAO) re-use for three dimension video.

FIG. 2 shows an example video encoder 112 that implements an SAO filter 114 for 3DVC for dependent view coding, and directly re-use SAO filter parameters of an independent view or a coded dependent view to encode another dependent view, or re-use only part of the SAO filter parameters of the independent view or a coded dependent view to encode another dependent view. In certain implementations, the video encoder 112 may be implemented as part of a central processing unit, part of integrated circuit chipset, or as a separate component/device. As discussed above, in certain implementations, the video encoder 112 may be implemented as firmware or software, such as a codec. Furthermore, FIG. 2 is merely illustrative and may contain additional blocks or components and/or different arrangement of the blocks or components.

As discussed, there are multiple views in a 3DVC system, known as or designated as independent view and dependent views. The independent view is coded as the base view using for example, a HEVC standard encoder (e.g., encoder 112). Dependent views may be coded not only using the temporal and spatial correlations in the same view, but also using the inter-view correlations among neighboring views. An inter-view coding tool for coding the dependent views is disparity-compensated prediction (DCP), which is added as an alternative to motion-compensated prediction (MCP). MCP may refer to an inter picture prediction that uses preexisting coded pictures of the same view, while DCP may refer to an inter picture prediction that uses preexisting coded pictures of other views.

In an implementation, the video encoder 112 receive un-encoded and/or un-compressed video that includes image frames that are to be encoded to generate corresponding encoded frames in the form of an 3DVC bit stream 202. In this implementation, one or more components or blocks of the video encoder 112 may be configured to perform 3DVC encoding consistent with one or more standards and the processes and techniques describe herein.

For example, video encoder 112 includes one or more of the following components. It is to be understood the other components may be included, and that components may be combined (i.e., functionality of components combined). Reference to a coding unit or CU may be directed to a portion, or slice of a picture to be coded.

1) Component 204-1 may be a mechanism to apply SAO filter 114 to 3D dependent reconstructed dependent views.
2) Component 204-2 may be a mechanism to re-use SAO parameters of other coded views to encode a dependent view. Such an implementation may be referred to as which inter-view SAO parameter re-use. In an implementation the SAO parameters may include SAO control flags, SAO types, SAO offset values, and etc.

3) Component 204-3 may be a mechanism to directly re-use the SAO parameters of an independent view to encode a dependent view.
4) Component 204-4 may be mechanism to directly re-use part of the SAO parameters of an independent view to encode a dependent view, and allow the encoder 112 to generate the other part of the SAO parameters for the dependent view and send the generated parameters to a decoder for the dependent view.
5) Component 204-5 may be a mechanism to directly re-use the SAO parameters of a coded dependent view to encode another dependent view.
6) Component 204-6 may be a mechanism to directly re-use part of the SAO parameters of a coded dependent view to encode another dependent view, and allow the encoder 112 to generate the other part of the SAO parameters for the coding dependent view and send the generated parameters to a decoder for the dependent view.
7) Component 204-7 may be a mechanism that does not re-use SAO parameters of other views, but allows the encoder 112 to generate all SAO parameters for a current coding dependent view and send the generated parameters to a decoder.
8) Component 204-8 may be a mechanism that allows the encoder 112 to adaptively decide to re-use the SAO parameters of other coded views or not, and then send a decision flag to a decoder. The decision flag may be a sequence level flag, a group of pictures (GOP) level flag, a slice level flag, or a coding unit level flag. The three commonly used video color spaces, Y, Cb, and Cr, may share the same decision flag or have individual decision flags respectively.
9) Component 204-9 may be a mechanism to apply different SAO parameter re-use schemes for Y, Cb, and Cr color spaces (e.g., apply adaptive re-use to Y component but apply mandatory re-use for Cb and Cr color spaces)
10) Component 204-10 may be a mechanism to re-use the SAO parameters from the collocated coding unit of a coded view.
11) Component 204-11 may be a mechanism to re-use the SAO parameters from the coding units in a coded view pointed by a disparity vector.
12) Component 204-12 may be a mechanism to re-use the SAO parameters from the coding units in a coded view selected by depth information and camera parameters.
13) Component 204-13 may be a mechanism to re-use or partly re-use the SAO parameters of a spatial or temporal neighboring coded coding unit to encode the current coding unit in a dependent view, which could be called intra-view SAO parameter re-use. The spatial neighbor coding unit may be left neighbor coding unit, top neighbor coding unit, top-left neighbor coding unit, or other available coded spatial neighbor coding units. The temporal neighbor coding unit may be a collocated coding unit in an intra-view reference frame, a coding unit in an intra-view reference frame pointed by a motion vector. In an implementation, the encoder 112 determines which neighboring coding unit is used and sends the decision result to decoder.
14) Component 204-14 may be a mechanism to allow the encoder 112 to adaptively determine whether to apply intra-view or inter-view SAO parameters re-use, and then send the decision result to decoder.
15) Component 204-14 may be a mechanism to apply inter-view or intra-view SAO parameter re-use based on the prediction mode of the coding unit. For example, if the coding unit is intra-view predicted, then apply intra-view SAO parameter re-use. If the coding unit is inter-view predicted, then apply inter-view SAO parameter re-use.

Figure 3:
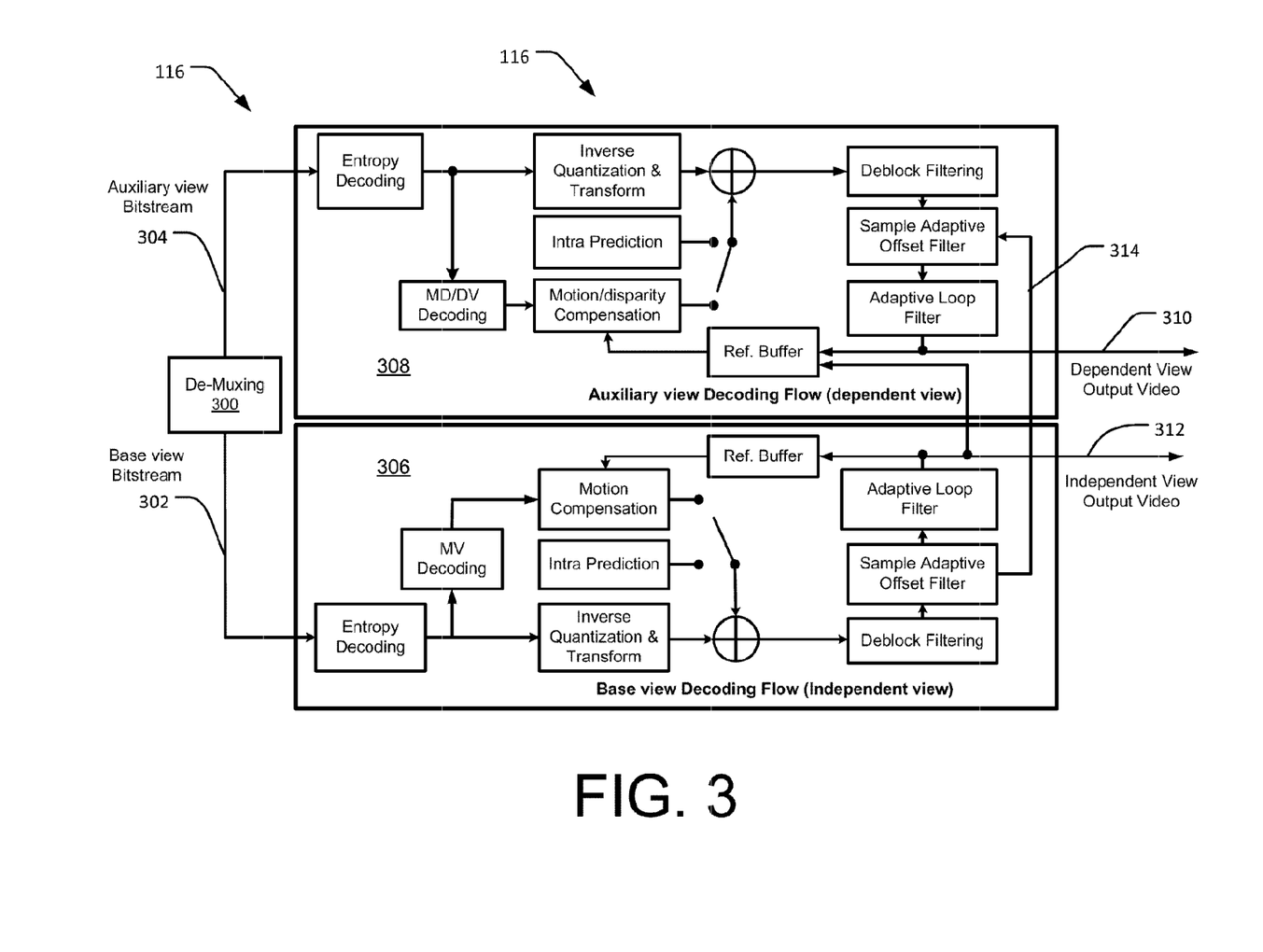
FIG. 3 is an illustrative diagram of an example video decoder for implementing Sample Adaptive Offset (SAO) re-use for three dimension video.

FIG. 3 shows an example video decoder 116. Video decoder receives 3DVC bit stream 202 and performs de-mux 300 on the 3DVC bit stream 202. A base view or independent view bit stream 302, and an auxiliary view or dependent view bit stream 304, are output from de-muxing block 300. A base view decoding flow block 306 processes the base view bit stream 302, and an auxiliary view decoding flow block 308 processes the auxiliary view stream 304. For HEVC standard based 3DVC, the base view bit stream 302 may be decoded by an HEVC decoder.

The auxiliary view stream 304 is not independently decoded to reconstruct the output video 310. The auxiliary view stream 304 is decoded together with the base view reconstructed video 312, because inter-view prediction may be used for the encoding of some dependent view blocks. The reconstructed frame of base view (independent view) may be added as inter-view reference frame for the coding of auxiliary view (dependent view). This is illustrated by 314 that shows the SAO re-use. Therefore, the decoded SAO information of base view or other decoded dependent views could be re-used for the SAO filtering of current dependent view.

In an implementation, in applying 3DVC, for each view, SAO may be conditionally performed after a de-blocking filter in order to improve both objective and subjective quality of a reconstructed signal. The SAO filtering for independent view and dependent views are performed using individual SAO parameters, respective. SAO may be used to classify reconstructed pixels into different categories and then reduce the distortion by adding an offset to luma and/or chroma components for each category pixels.

Figure 4:
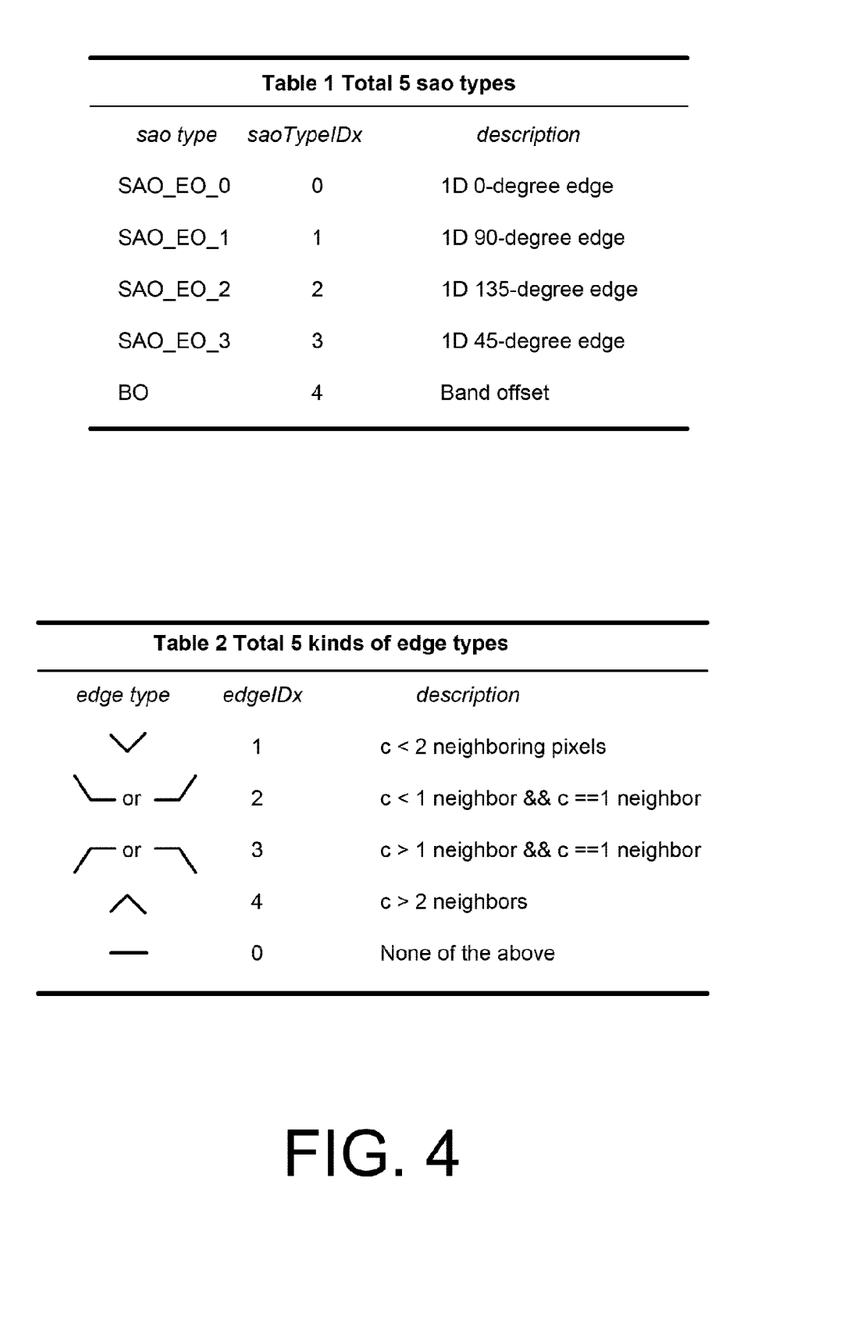
FIG. 4 tables illustrating Sample Adaptive Offset (SAO) types and edge types in High Efficient Video Coding.

Implementations provide for an offset table to of a particular category to be computed/determined at the encoder 114 and transmitted to the decoder 116. Particular implementations provide that the encoder 114 and decoder reside at different devices, and that a 3DVC bit stream 202 be transmitted from encoder 114 to the decoder 116. Table 1 of FIG. 4 shows an example of 5 different SAO types, and Table 2 shows an example of 5 different kinds of edge types.

SAO filtering at the encoder 114 side may be implemented as follows:
1) Divide a picture into largest coding unit (LCU)—aligned regions.
2) Classify each region into different SAO types via rate distortion optimization (RDO). In this implementation, there are 5 possible SAO types denoted by "saoTypeIdx", as shown in Table 1 of FIG. 4.
3) For a specific region
   a) if "saoTypeIdx"=4
      i) Classify pixels into different band types according to pixel's intensity. The intensity from 0 to 255 is equally divided into 32 band types, denoted by "bandIdx." For example, there is an offset table with 4 offset values for successive 4 bands transmitted for a specific region. Meanwhile, "sao_band_position" is used to signal the first band that SAO will be applied. Therefore, a specific offset value can be derived for each pixel according to its band type.
      ii) For each pixel, add the offset value to the original pixel value.
   b) Else, if "saoTypeIdx"=0, 1, 2, or 3 i) Compute edge type for each pixel. In this example, there are 5 kinds of edge types for each edge offset (EO) type, denoted by "edgeIdx", as shown in Table 2. The offset value is obtained for a specific pixel according to its edge type.

ii) For each pixel, add the offset value to the original pixel value.

c) Else, do not perform SAO.

SAO filtering at the decoder 116 side may be implemented as follows:

1) For all pixels in a specific region, perform per-pixel SAO filtering.
2) Each region receives a "saoTypeIdx" to indicate which SAO type it belongs to. If "saoTypeIdx=4", the current region will also receive a band Position.
3) For each pixel in a specific region
   a) If saoTypeIdx"=0, 1, 2, or 3, compute its "edgeIdx" and add the received offset of the edge type to the pixel value.
   b) Else if "saoTypeIdx"=4, compute its band Idx and add the received offset of the band type to the pixel value.
   c) Else, do not perform SAO.

Figure 5:
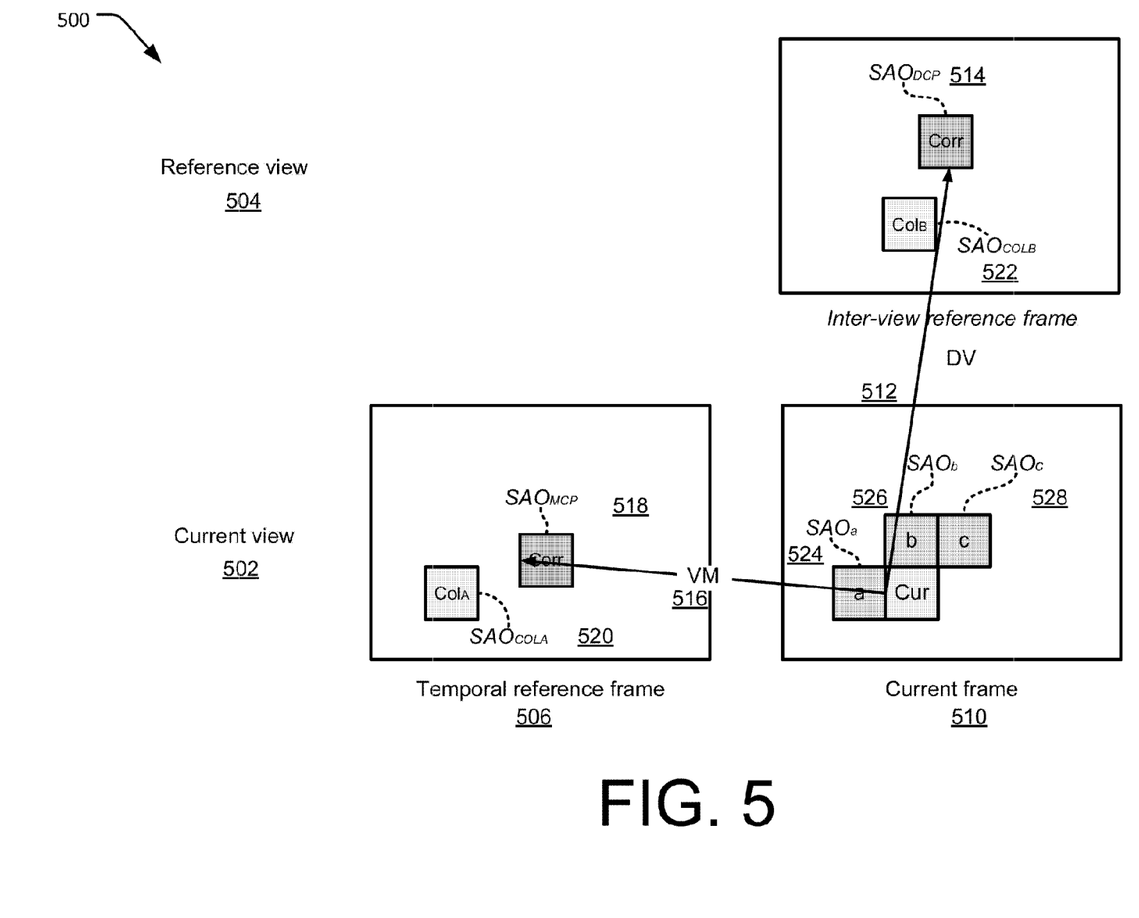
FIG. 5 is an illustrative diagram for possible reference coding units whose Sample Adaptive Offset (SAO) parameters are re-used to encode the current coding unit in current frame.

FIG. 5 shows a mapping 500 between a coding unit in current view 502 and coding units in reference frames or reference view 504. There may be various possible candidates for SAO parameters re-use for a dependent view. The multiple views in a 3DVC system may have a high degree of similarity. Therefore, when performing SAO filtering for dependent views, the SAO parameters such as SAO control flags, SAO types, SAO offset values, SAO band positions can be inherited from already coded independent view or dependent views. Also, SAO parameters can also be inherited from the pre-coded reference frame in the same view (i.e., current view 502). To inherit from a temporal reference frame 506 or an inter-view reference frame 508 could be 1) according to the mandatory specification of the standard, 2) adaptively decided by the encoder and then a flag may be sent to the decoder, or 3) decided by the prediction mode of the current coding unit, where the prediction mode may use motion compensated prediction (MCP) or disparity compensated prediction (DCP).

The reference coding unit could be a) the spatial neighbor coding units in current frame 510, b) the collocated or motion compensated prediction (MCP) coding unit in a temporal reference frame 506, or c) the collocated or disparity compensated prediction (DCP) coding unit in an inter-view reference frame 508.

For example, if the current coding unit is coded with DCP (i.e., predicted with disparity vector or DV 512), the inter-view correlation is stronger than the temporal correlation for such a block. Therefore, the SAO information is inherited from corresponding block in the inter-view reference frame 508, denoted as $SAO_{DCP}$ 514.

If, the current block is MCP (i.e., predicted with motion vector or MV 516), the SAO information is inherited from corresponding block in the temporal reference frame, denoted as $SAO_{MCP}$ 518.

If the current block is intra-coded, the SAO information could be inherited from collocated block in reference frames ($SAO_{col\_A}$ 520 or $SAO_{col\_B}$ 522 or spatial neighboring block (SAO a 524, SAO b 526, or SAO c 528).

Consistency should exist as to providing a standard specification as to which block is selected and what kind of SAO information should be inherited, so that the encoder and decoder may produce the same SAO filtering. A corresponding block in the reference frame may be derived by different methods using known information such as block location, coded motion/disparity vector, depth information, camera parameters, etc. For example, the corresponding coding unit could be (a) the collocated coding unit in the temporal/inter-view reference frame with the same location of current coding unit; (b) the motion/disparity-compensated coding unit using preexisting coded motion/disparity vector; (c) the motion/disparity-compensated coding unit retrieved by depth information and camera parameters, etc.

In addition, since the temporal/inter-view corresponding coding unit may overlap multiple blocks due to the block-based prediction, various methods may be used such as dominant overlapped block to represent the corresponding block.

In the above description of example implementations, for purposes of explanation, specific numbers, materials configurations, and other details are set forth in order to better explain the present invention, as claimed. However, it will be apparent to one skilled in the art that the claimed invention may be practiced using different details than the example ones described herein. In other instances, well-known features are omitted or simplified to clarify the description of the example implementations.

The inventors intend the described example implementations to be primarily examples. The inventors do not intend these example implementations to limit the scope of the appended claims. Rather, the inventors have contemplated that the claimed invention might also be embodied and implemented in other ways, in conjunction with other present or future technologies.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that may be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks may be combined in any order to implement the processes or an alternate process. Additionally, individual blocks may be deleted from the processes without departing from the spirit and scope of the subject matter described herein.

Based on the high correlation between neighboring views, the SAO parameters between current coding unit and the corresponding coding unit in the inter-view reference frame may be very similar. By using the proposed SAO parameters re-use method, the proposed methods and techniques may save bits (i.e., processing of video) for indicating the SAO information. As discuss the methods and techniques may be performed at the encoder and decoder. In certain implementations, flags may be set and provided from the encoder to decoder to indicate whether to us such SAO parameter re-use.

Figure 6A:
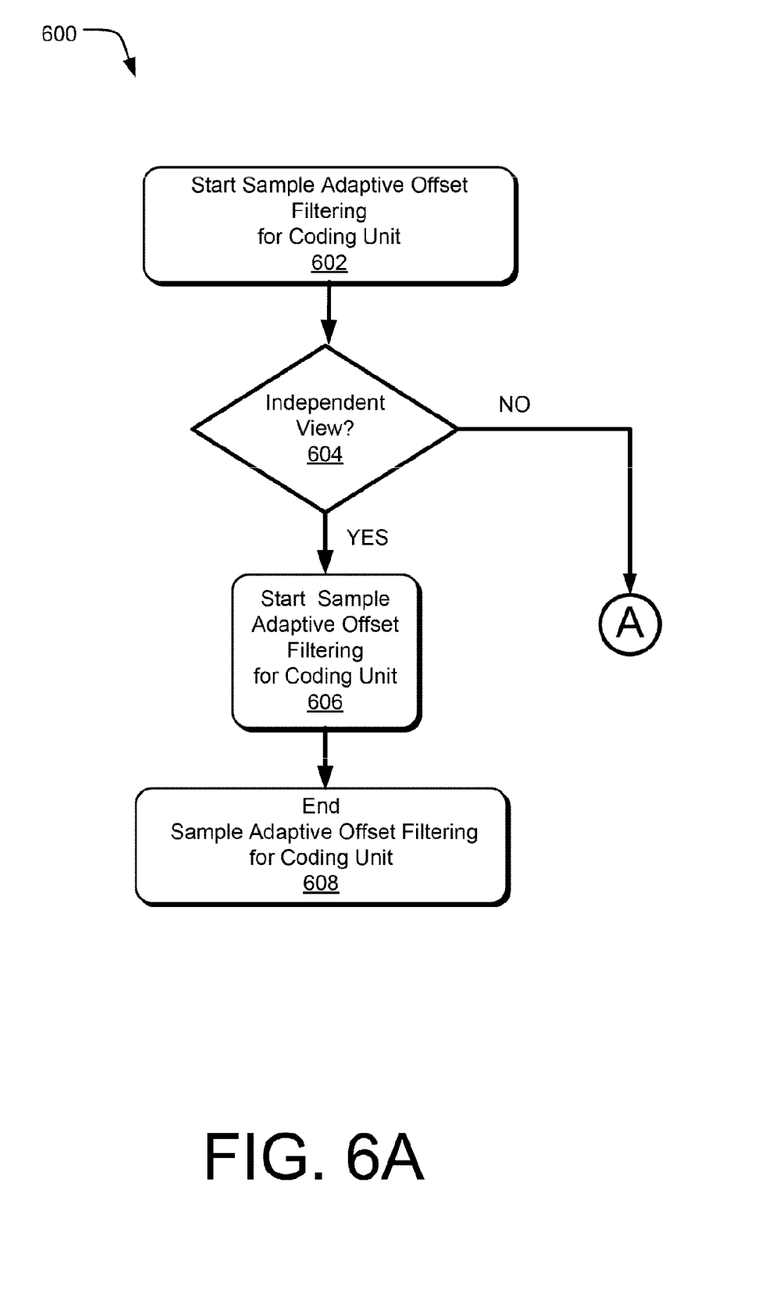
FIGS. 6A and 6B is a flow chart of an example process for Sample Adaptive Offset (SAO) re-use for three dimension video decoding.
Figure 6B:
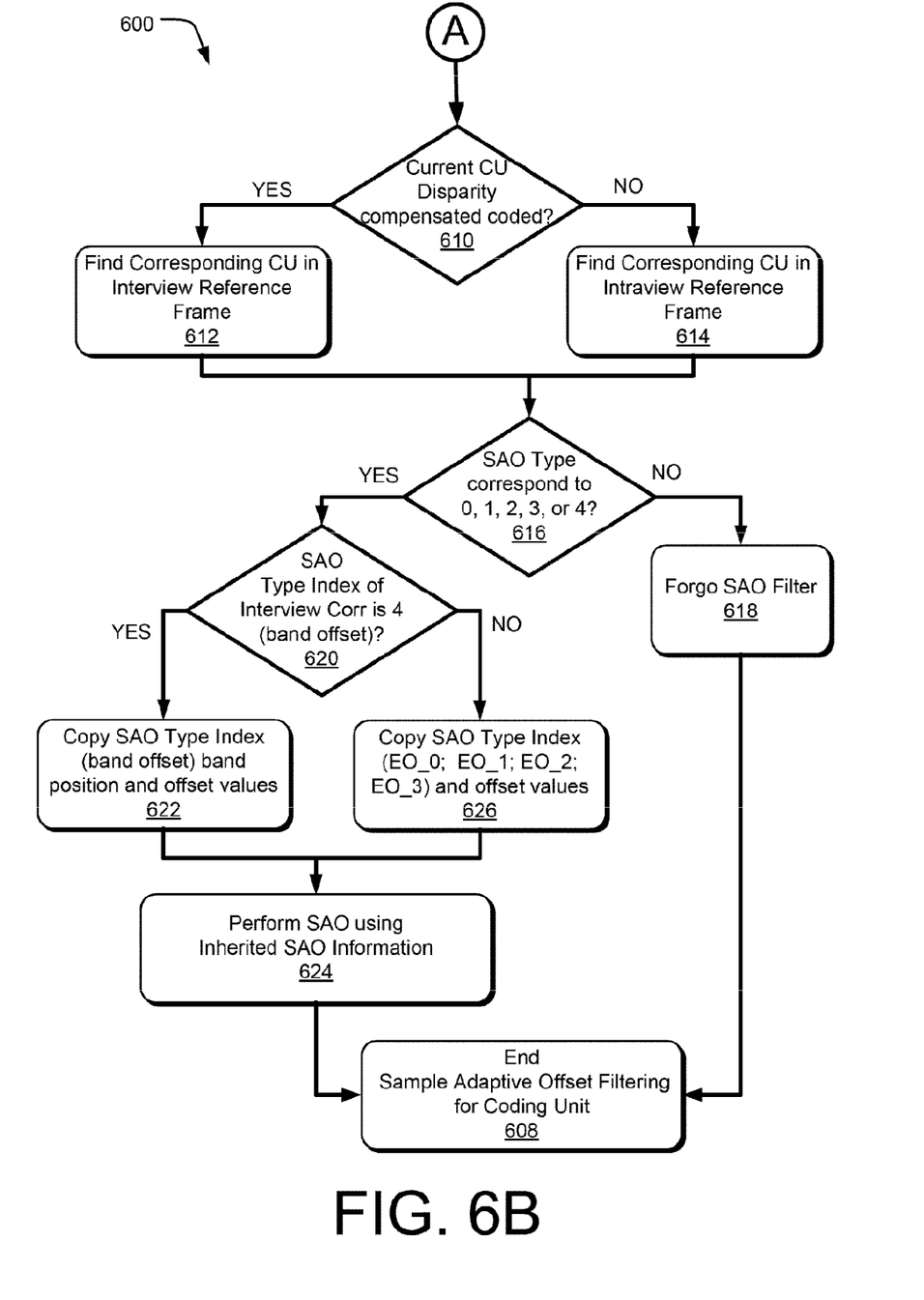

FIG. 6 shows an example process flowchart 600 illustrating an example method for SAO parameters re-use. This is based on the basic unit of the SAO parameter re-use process and techniques being a coding unit or CU. Each picture may be divided into CUs before encoding and decoding. When performing the SAO parameter re-use process and techniques, first find the corresponding CU in the reference frame, and second re-use the SAO information such as the SAO filter control flag, saoTypeIdx, band position, and offset values from corresponding CU to encode the current CU.

At block 602, for a current coding unit (CU), SAO filtering is performed. A determination is made if the current CU is from an independent view. If the determination is "YES", following the YES branch of block 604, then at block 606, SAO filtering for the CU is performed. This may be a traditional SAO filter process in HEVC standard which is applied to the current CU.

If the current CU is not an independent view, i.e., the current CU dependent view, then following the NO branch of block 604, then SAO re-use is applied to the current CU. If the current CU in dependent view is coded with disparity compensation, the SAO parameters of the reference CU from inter-view reference frame are re-used for filtering current CU. Otherwise, the SAO parameters of the reference frame from intra-view reference frame are re-used for filtering current CU. If the current CU is disparity compensated coded, following the YES branch of block 610, at block 612, a corresponding CU is found in an interview reference frame. Otherwise, if the current CU is not disparity compensated coded, following the NO branch of block 610, at block 614, a corresponding CU is found in an intraview reference frame.

If the SAO type (see table 1 of FIG. 5), is not in the range of [0, 4], then following the NO branch 616, at block 618 no SAO filtering is performed. This may indicate that SAO filtering is disabled. In other words, there will be no SAO filtering for the current CU.

If the SAO type (see table 1 of FIG. 5), is in the range of [0, 4], SAO filtering is performed. If SAO type is 4, the following the YES branch of block 620, at block 622, and at block 624 the band position and offset values are re-used to filter current CU. Otherwise, if SAO type is not 4, then edge offset type and offset values are re-used to filter the current CU.

Figure 7:
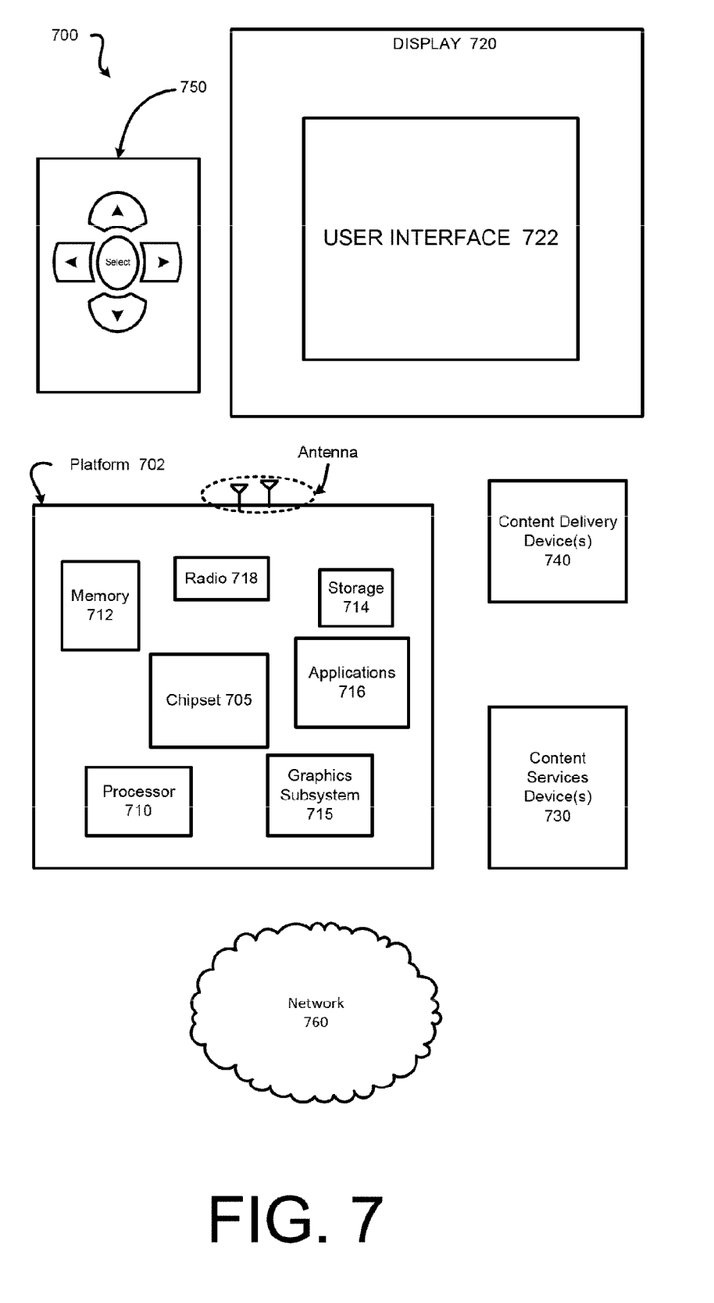
FIG. 7 is an illustrative diagram of an example system that implements Sample Adaptive Offset (SAO) re-use for three dimension video.

FIG. 7 illustrates another example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

Figure 8:
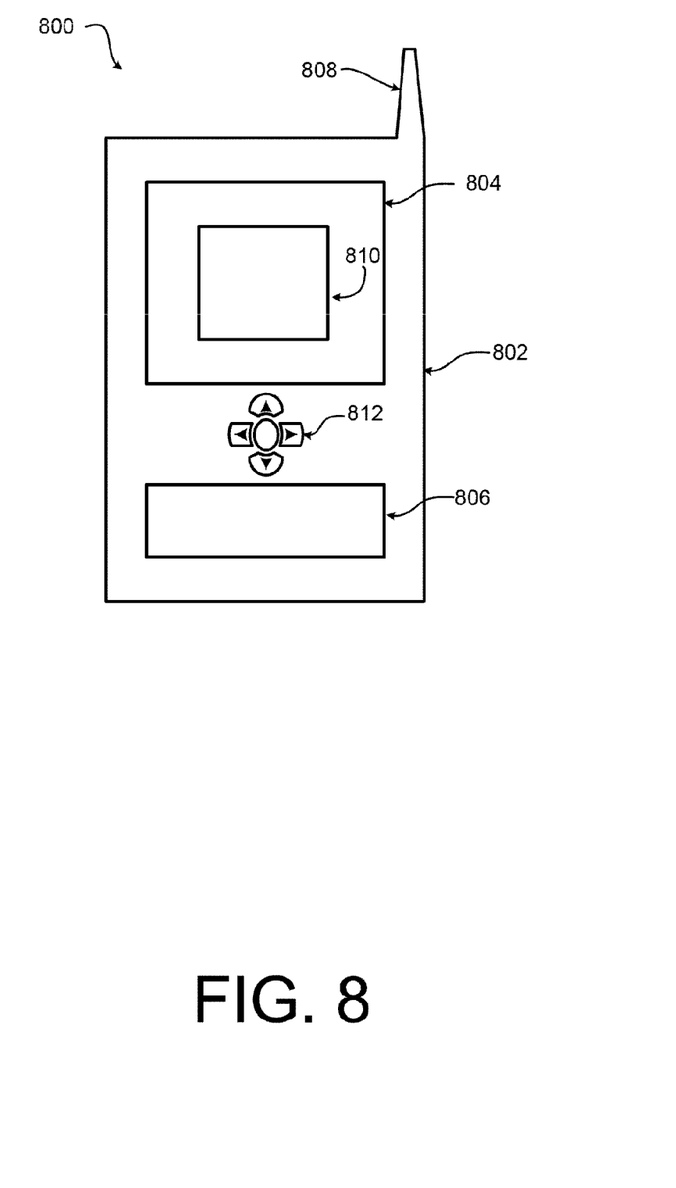
FIG. 8 is an illustrative diagram of an example device, all arranged in accordance with at least some implementations of present disclosure.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, device 800 may include a housing 802, a display 804, an input/output (I/O) device 806, and an antenna 808. Device 800 also may include navigation features 812. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A video encoder that implements three dimension (3D) coding to provide a 3D video coding (3DVC) bit stream comprising:

a sample adaptive offset (SAO) filter to receive uncoded/uncompressed video stream to encode an independent view of the uncoded/uncompressed video stream with SAO filter parameters, and to use the SAO filter parameters of the independent view to encode a first dependent view, wherein the SAO filter parameters of the encoded first dependent view are further re-used to encode a second dependent view based upon a prediction mode of a current coding unit of the second dependent view, wherein the prediction mode includes one of a disparity compensated prediction (DCP) or a motion compensated prediction (MCP), wherein the SAO filter is configured to inherit the SAO filter parameters of a first dependent view's inter-view reference frame and a second dependent view's temporal reference frame for the current coding unit of the second dependent view with the DCP prediction mode and the MCP prediction mode, respectively, wherein the current coding unit with the MCP prediction mode inherits the SAO filter parameters of a reference coding unit from an intra-view reference frame, the reference coding unit from the intra-view reference frame includes a coding unit from a collocated block of the temporal reference frame, and a coding unit from a spatial neighboring block of the current frame; and an output component to receive the encoded independent view and dependent views and output the 3DVC bit stream.

2. The video encoder of claim 1, wherein the video encoder transmits a decision flag to a decoder, the decision flag includes the re-used SAO filter parameters of the first and second dependent views.

3. The video encoder of claim 1, wherein the SAO filter comprises a first SAO filter for filtering of the independent view, and a second SAO filter for filtering of the first and second dependent views.

4. The video encoder of claim 1, wherein video encoder generates portions of the SAO filter parameters to code the first and second dependent views.

5. The video encoder of claim 1, wherein the second dependent view includes the collocated block of the temporal reference frame and the spatial neighboring block of the current frame.

6. The video encoder of claim 1, wherein the prediction mode further includes one of intra-coding.

7. The video encoder of claim 1, wherein the SAO filter parameters are used to apply re-use schemes for Y, Cb, and Cr color spaces.

8. The video encoder of claim 1, wherein the SAO filter parameters are selected from depth and camera parameters.

9. The video encoder of claim 1, wherein the SAO filtering comprises: dividing a picture into largest coding unit (LCU)—aligned regions; and classifying each region into different SAO types.

10. The video encoder of claim 1 further comprising a component to determine whether to apply inter-view or intra-view SAO filter parameter re-use.

11. The video encoder of claim 1 wherein the 3DVC bit stream is sent to a decoder that is implemented to use the SAO filter parameters of the independent and the first and second dependent views.

12. The video encoder of claim 1, wherein the video encoder is configured as one of central processing unit, integrated circuit chipset, or codec.

13. A video decoder that processes a three dimension video coding (3DVC) bit stream comprising:
a demultiplexor to receive the 3DVC bit stream and separate the 3DVC bit stream into a base view stream and an auxiliary view stream, wherein the base view stream includes sample adaptive offset (SAO) filter parameters;
a base view decoding block to process the base view stream and to use the SAO filter parameters; and
an auxiliary view stream decoding block to process the auxiliary view stream that includes a first and a second dependent views, wherein the sample adaptive offset (SAO) filter parameters of the base view stream are selectively used to decode the first dependent view, wherein the SAO filter parameters of the decoded first dependent view are further re-used to decode the second dependent view based upon a prediction mode of a current coding unit of the second dependent view, wherein the prediction mode includes one of a disparity compensated prediction (DCP) or a motion compensated prediction (MCP), wherein the auxiliary view stream decoding block is configured to inherit the SAO filter parameters of a first dependent view's inter-view reference frame and a second dependent view's temporal reference frame for the current coding unit of the second dependent view with the DCP prediction mode and the MCP prediction mode, respectively, wherein the current coding unit with the MCP prediction mode inherits the SAO filter parameters of a reference coding unit from an intra-view reference frame, the reference coding unit from the intra-view reference frame includes a coding unit from a collocated block of the temporal reference frame, and a coding unit from a spatial neighboring block of the current frame.

14. The video decoder of claim 13, wherein the base view stream and the auxiliary view stream are decoded together.

15. The video decoder of claim 13, wherein the demultiplexor further receives a decision flag that includes re-used SAO filter parameters of the first and second dependent views.

16. A device comprising:
one or more processors;
memory configured to the processors;
a video encoder configured to the processors and memory comprising:
a video input to supply a video bit stream;
a sample adaptive offset (SAO) filter to receive the video stream and encodes an independent view of the video stream with SAO filter parameters, and to use the SAO filter parameters of the independent view to encode a first dependent view, wherein the SAO filter parameters of the encoded first dependent view are further re-used to encode a second dependent view based upon a prediction mode of a current coding unit of the second dependent view, wherein the prediction mode includes one of a disparity compensated prediction (DCP) or a motion compensated prediction (MCP), wherein the SAO filter is configured to inherit the SAO filter parameters of a first dependent view's inter-view reference frame and a second dependent view's temporal reference frame for the current coding unit of the second dependent view with the DCP prediction mode and the MCP prediction mode, respectively, wherein the current coding unit with the MCP prediction mode inherits the SAO filter parameters of a reference coding unit from an intra-view reference frame, the reference coding unit from the intra-view reference frame includes a coding unit from a collocated block of the temporal reference frame, and a coding unit from a spatial neighboring block of the current frame; and
a video output to receive encoded independent view and the dependent views and output the 3DVC bit stream.

17. The device of claim 16, wherein the video encoder transmits a decision flag to a decoder, the decision flag includes the re-used SAO filter parameters of the first and second dependent views.

18. The device of claim 16, wherein the SAO filter comprises a first SAO filter for filtering of the independent view, and a second SAO filter for filtering of the first and second dependent views.

19. The device of claim 16, wherein the video encoder generates portions of the SAO filter parameters to code the first and second dependent views.

20. The device of claim 16, wherein a determination is made as to use all, a subset, or none of the SAO filter parameters of the independent view for the first and second dependent views.

21. The device of claim 16, wherein the SAO filter parameters include one or more of the following: control flags, SAO types, and SAO offset values, which are communicated to a decoder.

22. A method of implementing parameter re-use for three dimension video coding (3DVC) comprising:
performing sample adaptive offset (SAO) filtering to a coding unit (CU) of an independent view to generate SAO filtering parameters; and applying the generated SAO filtering parameters to the coding units of a first dependent view, wherein the SAO filter parameters of the encoded first dependent view are further re-used to encode a second dependent view based upon a prediction mode of a current coding unit of the second dependent view, wherein the prediction mode includes one of a disparity compensated prediction (DCP) or a motion compensated prediction (MCP), wherein the SAO filtering comprises inheriting of the SAO filter parameters of a first dependent view's inter-view reference frame and a second dependent view's temporal reference frame for the current coding unit of the second dependent view with the DCP prediction mode and the MCP prediction mode, respectively, wherein the current coding unit with the MCP prediction mode inherits the SAO filter parameters of a reference coding unit from an intra-view reference frame, the reference coding unit from the intra-view reference frame includes a coding unit from a collocated block of the temporal reference frame, and a coding unit from a spatial neighboring block of the current frame.

23. The method of claim 22, wherein the prediction mode further includes one of intra-coding.

24. The method of claim 22, wherein SAO filtering comprises: dividing a picture into largest coding unit (LCU)—aligned regions; and classifying each region into different SAO types.

* * * * *